United States Patent
Yasue et al.

(10) Patent No.: US 7,090,190 B2
(45) Date of Patent: Aug. 15, 2006

(54) FLOW CONTROL VALVE

(75) Inventors: Hiroto Yasue, Kasugai (JP); Yasushi Hirako, Kasugai (JP); Hiroshi Kagohashi, Kasugai (JP); Kazuhiro Sugata, Kasugai (JP)

(73) Assignee: CKD Corporation, Komaki (JP)

( * ) Notice: Subject to any disclaimer, the term of this patent is extended or adjusted under 35 U.S.C. 154(b) by 0 days.

(21) Appl. No.: 11/188,635

(22) Filed: Jul. 26, 2005

(65) Prior Publication Data

US 2005/0253100 A1 Nov. 17, 2005

Related U.S. Application Data

(63) Continuation of application No. PCT/JP03/02758, filed on Mar. 7, 2003.

(51) Int. Cl.
*F16K 31/363* (2006.01)
*F16K 51/00* (2006.01)

(52) U.S. Cl. ................... 251/63.5; 251/285
(58) Field of Classification Search ............ 251/285, 251/284, 60, 63, 63.5, 63.6
See application file for complete search history.

(56) References Cited

U.S. PATENT DOCUMENTS

| | | | | |
|---|---|---|---|---|
| 5,390,895 A | * | 2/1995 | Iwabuchi | 251/60 |
| 5,906,353 A | * | 5/1999 | Someya et al. | 251/58 |
| 5,927,605 A | * | 7/1999 | Odajima et al. | 251/331 |
| 6,176,438 B1 | * | 1/2001 | Sato et al. | 251/331 |
| 6,481,460 B1 | * | 11/2002 | Fukano et al. | 137/554 |
| 6,889,706 B1 | * | 5/2005 | Fukano et al. | 137/487.5 |

FOREIGN PATENT DOCUMENTS

| | | | |
|---|---|---|---|
| JP | U 61-84282 | | 6/1986 |
| JP | 05118465 A | * | 5/1993 |
| JP | A 5-118465 | | 5/1993 |
| JP | A 5-118466 | | 5/1993 |
| JP | 05158552 A | * | 6/1993 |
| JP | A 5-158552 | | 6/1993 |
| JP | 05231403 A | * | 9/1993 |
| JP | A 5-231403 | | 9/1993 |
| JP | A 7-1381 | | 1/1995 |
| JP | 07253170 A | * | 10/1995 |
| JP | A 7-253170 | | 10/1995 |
| JP | A 8-170755 | | 7/1996 |
| JP | B2 2677536 | | 7/1997 |
| JP | A 10-252942 | | 9/1998 |
| JP | A 11-347395 | | 12/1999 |
| JP | A 2000-148254 | | 5/2000 |

* cited by examiner

*Primary Examiner*—Justine R. Yu
*Assistant Examiner*—Andrew J Rost
(74) *Attorney, Agent, or Firm*—Oliff & Berridge, PLC

(57) ABSTRACT

There is disclosed a flow control valve which regulates a flow rate by determining a stop position of a piston by contact in an opened state, and which enables remote and high-precision flow rate regulation. In a closed state, an urging force of a return spring acts on a piston, bringing a diaphragm into close contact with a valve seat. In this state, when compressed air is supplied into a pilot chamber, moving the piston, the diaphragm is brought out of contact with the valve seat. Then, the piston comes into contact with a nut and the diaphragm is stopped providing a fixed clearance between the diaphragm and the valve seat. An opened state is established. Of course, the nut can be moved to any desired position by means of a serve motor or the like, so that a position at which the piston comes into contact with the nut can be changed.

6 Claims, 5 Drawing Sheets

FLOW CONTROL VALVE

CROSS-REFERENCE TO RELATED APPLICATIONS

This application is a continuation application based upon and claims the benefit of the prior PCT International Patent Application No. PCT/JP03/02758 filed on Mar. 7, 2003, the entire contents of which are incorporated herein by reference.

BACKGROUND OF THE INVENTION

1. Field of the Invention

The present invention relates to a flow control valve which is changed to and held in an opened state by pressure of compressed air against an urging force of a spring and more particularly to a flow control valve for use in a semiconductor manufacturing device.

2. Description of Related Art

As one of conventional flow control valves, for example, there is a flow control valve disclosed in Japanese unexamined patent publication No. 7(1995)-253170. FIG. 4 is a sectional view of such flow control valve 100. This flow control valve 100 has an under body 120 with an inlet port 121 and an outlet port 122 formed on either side. An intermediate body 130 formed with a first operation port 131 is secured on the under body 120. An upper body 140 formed with a second operation port 141 and attached with an adjustment screw 142 is secured on the intermediate body 130. Thus, the outer shape of the whole flow control valve 100 is determined.

The under body 120 is centrally provided with an annular valve seat 101 in addition to the inlet port 121 formed at a right side in the figure and the outlet port 122 formed at a left side in the figure. An inside A of the valve seat 101 is communicated with the inlet port 121, whereas an outside B of the valve seat 101 is communicated with the outlet port 122. When a valve body 102 is brought into contact with the valve seat 101, communication between the inlet port 121 and the outlet port 122 is interrupted. When the valve body 102 is brought out of contact with the valve seat 101, the communication between both ports 121 and 122 is allowed.

The intermediate body 130 is a substantially cylindrical member secured on the under body 120 at a center area thereof. The intermediate body 130 is formed with the first operation port 131 and further internally formed with a small-diameter cylinder 132 and a large-diameter cylinder 133. In the intermediate body 130, a substantially columnar piston 150 is fit to be slidable up and down. The piston 150 has a central large-diameter portion 151, a lower small-diameter portion 152 provided under the large-diameter portion 151, and an upper small-diameter portion 153 provided above the large-diameter portion 151. The large-diameter portion 151 is air-tightly engaged in the large-diameter cylinder 133. The lower small-diameter portion 152 is air-tightly engaged in the small-cylinder 132. A lower surface 154 of the large-diameter portion 151 and the intermediate body 130 define a first operation chamber 134. The first operation port 131 of the intermediate body 130 opens into the first operation chamber 134. Through the first operation port 131, air pressure is applied to or released from the first operation chamber 134. When the air pressure is applied to the first operation chamber 134, the piston 150 is pushed up.

The valve body 102 is attached to a lower end of the lower small-diameter portion 152 of the piston 150. The circumferential portion of the valve body 102 forms a diaphragm 156 of which the peripheral edge is sandwiched between the under body 120 and the intermediate body 130. The valve body 102, which is movable in conjunction with the vertical movement of the piston 150, is brought out of contact or into contact with the valve seat 101 of the under body 120. When the valve body 102 is brought into contact with the valve seat 101, communication between the inlet port 121 and the outlet port 122 is interrupted. When the valve body 102 is brought out of contact with the valve seat 101, the communication between both ports 121 and 122 is allowed.

The upper body 140 is a substantially cylindrical member secured on the intermediate body 130. The upper body 140 is centrally formed with a through hole 143 in addition to the second operation port 141. The upper small-diameter portion 153 of the piston 150 is engaged in the hole 143 of the upper body 140. The upper surface 155 of the large-diameter portion 151, the intermediate body 130, and the upper body 140 define a second operation chamber 144. The second operation port 141 of the upper body 140 opens into the second operation chamber 144. Through the second operation port 141, air pressure is applied to or released from the second operation chamber 144. When the air pressure is applied to the second operation chamber 144, the piston 150 is pushed down. The upper body 140 is formed with a spring groove 145. A return spring 146 is located between the upper surface 155 of the piston 150 and the spring groove 145. The return spring 146 urges the piston 150 downward.

An upper half of the hole 143 of the upper body 140 is formed with screw threads. The adjustment screw 142 is mounted in this portion. The adjustment screw 142 has a lower end 147 which restricts upward movement of the piston 150. Changing of the height of the lower end 147 by turning of the adjustment screw 142 allows changes of a stop position of the piston 150, thereby adjusting a clearance between the valve body 102 and the valve seat 101 at a valve opening time. It is to be noted that a lock nut 148 may be used to hold the adjustment screw 142 against inadvertent movement.

The operation of the flow control valve 100 having the above structure will be explained below. The flow control valve 100 is operated by the application of air pressure to the first operation port 131 or the second operation port 141. A means for supplying the air pressure may be anything, for example, a compressed-air cylinder and an air-pressure pump.

The state where no air pressure is applied to both the first operation port 131 and second operation port 141 is first considered. In this state, the piston 150 receives the urging force of only the return spring 146. The piston 150 is therefore moved downward until the valve 102 attached at a lower end of the piston 150 comes into contact with the valve seat 101. In this state, the valve body 102 is held in contact with the valve seat 101, interrupting communication between the inlet port 121 and the outlet port 122, the flow control valve 100 is closed.

When the air pressure is applied to the first operation port 131, the first operation chamber 134 of the flow control valve 100 is increased in pressure. This pushes the piston 150 upward against the urging force of the return spring 146 until the upper end of the piston 150 comes into contact with the lower end 147 of the adjustment screw 142, and then the piston 150 is stopped. The valve body 102 is accordingly moved together with the piston 150, providing a clearance between the valve seat 101 and the valve body 102, thereby allowing the communication between the inlet port 121 and the outlet port 122. Thus, the flow control valve 100 becomes opened.

In this state, when the adjustment screw 142 is operated to change the position of the lower end 147, the stop position of the piston 150 is changed. The clearance between the valve seat 101 and the valve body 102 is adjusted to control a flow rate during an opened state of the flow control valve 100.

When supply of the air pressure to the first operation port 131 is stopped and the pressure of the first operation chamber 134 is released, the flow control valve 100 is placed in a closed state again by the urging force of the return spring 146. At that time, air pressure is applied to the second operation port 141, the pressure in the second operation chamber 144 becomes high. This pressure assists the urging force of the return spring 146 to push the piston 150 downward. A valve closing operation is further ensured.

The control of a flow rate by means of the flow control valve 100 in FIG. 4 is however performed by manual turning of the adjustment screw 142 to change the lower end 147 of the screw 142 with which the upper end of the piston 150 comes into contact, changing the stop position of the piston 150 in the opened state. Accordingly, it could not be conducted by remote and high-precision control.

Particularly, the control of a flow rate by remote and high-precision control is required for a semiconductor manufacturing device. On this account, the flow control valve 100 shown in FIG. 4 would be unusable in the semiconductor manufacturing device.

FIG. 5 shows the flow control valve 100 of FIG. 4 additionally attached with an electro-pneumatic regulator 160 which controls a normally-closed proportional intake valve 161 and a normally-closed proportional discharge valve 162 through a control substrate 163. In this flow control valve 100 of FIG. 5, air pressure is applied to or released from the first operation port 131 through the electro-pneumatic regulator 160 to bring the valve into the opened state or the closed state. Thus, when the normally-closed proportional intake valve 161 is opened and simultaneously the normally-closed discharge proportion valve 162 is closed, air pressure is supplied and applied to the first operation chamber 134, thereby bringing the valve into the opened state and holding it in that state. Upon de-energization in this state, however, the normally-closed proportional intake valve 161 and the normally-closed proportional discharge valve 162 are closed, but the air pressure in the first operation chamber 134 remains retained. Depending on the state or the case, the opened state is sustained. This may continuously cause an outflow of a fluid to be controlled.

Especially, if the outflow of the controlled fluid is continued during de-energization, the flow control valve 100 of FIG. 5 would be unusable in the semiconductor manufacturing device which requires accurate flow control.

BRIEF SUMMARY OF THE INVENTION

The present invention has been made to solve the above problems and has a first object to provide a flow control valve which controls a flow rate by determining a stop position of a piston in a valve opened state by contact, and which enables the control of the flow rate by remote and high-precision control.

The present invention has a second object to provide a flow control valve which controls a flow rate by pressure of compressed air against an urging force of a spring, and which can prevent an outflow of a controlled fluid during de-energization.

To achieve the first purpose, according to one aspect of the invention, there is provided a flow control valve comprising: a valve seat; a piston which is movable; a valve body which is provided at an end of the piston, the valve body being movable into contact or out of contact with the valve seat in association with movement of the piston; a spring which urges the piston to bring the valve body in close contact with the valve seat to place the valve in a closed state; a pilot chamber which compressed air is supplied into, thereby moving the piston; a contact member with which the piston comes into contact when the piston is moved by pressure of the compressed air supplied into the pilot chamber, bringing the valve body out of contact with the valve seat to place the valve in an opened state; and a motor driving control mechanism, which moves the contact member to a desired position by forward and backward linear movements to determine a stop position of the valve body in the opened state.

The flow control valve of the present invention, preferably, further comprises an electro-pneumatic regulator provided with a supply circuit for supplying the compressed air into the pilot chamber and a discharge circuit for discharging the compressed air from the pilot chamber.

Further, in the flow control valve of the present invention, preferably, the discharge circuit is in a communication state while the electro-pneumatic regulator is in a de-energization state.

Further, the flow control valve of the present invention, preferably, further comprises a bleeding mechanism which brings the pilot chamber in slight communication with the outside, wherein the bleeding mechanism discharges the compressed air little by little from the pilot chamber to the outside even when each of the supply circuit and the discharge circuit is in an interruption state while the electro-pneumatic regulator is in the de-energization state.

Further, the above flow control valve is preferably used in a semiconductor manufacturing device.

In the flow control valve of the present invention having the above features, the urging force of the spring acts on the piston during the closed state, holding the valve body provided at the end of the piston in close contact with the valve seat. Herein, when compressed air is supplied into the pilot chamber, the pressure of the compressed air acts on the piston, which is then moved against the urging force of the spring. Accordingly, the valve body provided at the end of the piston is brought out of contact with the valve seat. When the piston then comes into contact with the contact member, the valve body provided at the end of the piston is stopped and a clearance between the valve body provided on the piston and the valve seat is fixed, establishing the opened state.

In the flow rate control valve of the present invention, of course, the contact member can be moved to any desired position by forward and backward linear movements by the motor driving control mechanism. Accordingly, the position at which the piston comes into contact with the contact member can be changed. This makes it possible to precisely adjust the clearance between the valve body provided in the piston and the valve seat.

In the flow rate control valve of the present invention, specifically, when the piston comes into contact with the contact member and is stopped, the valve body provided at the end of the piston is also stopped, providing the opened state and fixing the clearance between the valve body provided on the piston and the valve seat. In this regard, the motor driving control mechanism which moves the contact member to any desired position by the forward or backward linear movements, the clearance between the valve body provided on the piston and the valve seat can be adjusted precisely for flow rate control. The flow control valve of the present invention performs the flow rate regulation by determining the stop position of the piston by the contact in the opened state and can perform such flow rate regulation by remote and high-precision control.

In the flow rate control valve of the present invention, further, the pressure of compressed air supplied into the pilot chamber and the urging force of the spring serve to change the valve into the opened/closed state. The motor driving control mechanism does not contribute to this change to the opened/closed state, with the result that the response of change to the opened/closed state is excellent.

In the flow control valve of the present invention, the motor driving mechanism does not contribute to the change to the closed state and therefore no driving power of linear movements in the motor driving control mechanism is transmitted at the time when the valve body provided on the end of the piston is brought into contact with the valve seat. Accordingly, the driving power of linear movements in the motor driving control mechanism cause no damage to the valve body provided in the end of the piston and the valve seat.

The flow control valve of the present invention with the electro-pneumatic regulator can freely change the supplying/discharging speed of the compressed air with respect to the pilot chamber by electric control. Accordingly, it is possible to remotely and precisely control the speed of change to the opened/closed state in order to reduce overshoot and water hammer which may be caused at the time of valve opening/closing. Further, the response of change to the opened/closed state can be enhanced.

The flow control valve of the present invention, even if it includes the electro-pneumatic regulator, allows the compressed air to be continuously discharged from the pilot chamber during de-energization as long as the discharge circuit is in the communication state while the electro-pneumatic regulator is in the de-energization state. This allows the valve to be changed to the closed state and held in the closed state, thereby preventing the outflow of the controlled fluid during de-energization.

The flow control valve of the present invention, even if it includes the electro-pneumatic regulator of which de-energization state corresponds to the interruption state of both the supply circuit and the discharge circuit, allows the compressed air to be continuously discharged little by little from the pilot chamber by means of the bleeding mechanism during de-energization if the valve is provided with the bleeding mechanism which brings the pilot chamber into slight communication with the outside, and the valve is changed to the closed state and held in the closed state. It is accordingly possible to prevent the outflow of the controlled fluid during de-energization.

In the case where the flow control valve of the present invention is used in the semiconductor manufacturing device which requires the flow rate regulation by remote and high-precision control or the accurate flow control, the above mentioned effects can be enhanced largely.

In the semiconductor manufacturing device, further, the temperature control of the controlled fluid and ambient temperature is important. In the case where the flow control valve of the present invention is used in the semiconductor manufacturing device, the flow rate regulation is performed by the frequent opening and closing operations by means of the compressed air, the spring, and others, rather than by the motor driving control mechanism. The motor driving mechanism which may produce heating is less operated. Accordingly, there is no need for taking the influence which may be caused by the motor driving control mechanism into consideration.

Moreover, since the motor driving mechanism is less operated, the life of the motor will not be reduced by heating. Consequently, the motor driving control mechanism has no affect on the life of the flow control valve itself of the present invention.

According to another aspect of the present invention, there is provided a flow control valve comprising: a valve seat; a valve body which is movable into contact or out of contact with the valve seat; a pilot chamber which compressed air is supplied into, thereby moving the valve body to place the valve in an opened state; a spring which urges the valve body in close contact with the valve seat to place the valve in a closed state; and an electro-pneumatic regulator, comprising: a supply circuit for supplying the compressed air into the pilot chamber; and a discharge circuit for discharging the compressed air from the pilot chamber; and the discharge circuit being in a communication state while the electro-pneumatic regulator is in a de-energization state.

Further, according to another aspect of the invention, there is provided a flow control valve comprising: a valve seat; a valve body which is movable into contact or out of contact with the valve seat; a pilot chamber which compressed air is supplied into, thereby moving the valve body to place the valve in an opened state; a spring which urges the valve body in close contact with the valve seat to place the valve in a closed state; and an electro-pneumatic regulator, comprising: a supply circuit for supplying the compressed air into the pilot chamber; and a discharge circuit for discharging the compressed air from the pilot chamber; and a bleeding mechanism which brings the pilot chamber into slight communication with the outside, wherein the bleeding mechanism discharges the compressed air little by little from the pilot chamber to the outside even when each of the supply circuit and the discharge circuit is in an interruption state while the electro-pneumatic regulator is in the de-energization state.

Moreover, the above flow control valve is preferably used in a semiconductor manufacturing device.

Specifically, the flow control valve of the present invention is constructed so that, in the closed state, the valve body is in close contact with the valve seat by the urging force of the spring. When the compressed air is supplied into the pilot chamber, herein, the pressure of the compressed air exceeds the urging force of the spring. This brings the valve body out of contact with the valve seat, establishing the opened state. In this regard, when the discharge circuit is in the communication state while the electro-pneumatic regulator is in the de-energization state, the compressed air is allowed to be continuously discharged from the pilot chamber during de-energization, and the valve is changed to the closed state and held in the closed state. It is therefore possible to prevent the outflow of the controlled fluid during the de-energization.

The flow control valve of the present invention is also constructed so that, in the closed state, the valve body is in close contact with the valve seat by the urging force of the spring. When the compressed air is supplied into the pilot chamber, herein, the pressure of the compressed air exceeds the urging force of the spring. This brings the valve body out of contact with the valve seat, establishing the opened state.

In this regard, when the bleeding mechanism is further provided for bringing the pilot chamber into slight communication with the outside, the compressed air is allowed to be continuously discharged little by little from the pilot chamber to the outside, and the valve is changed to the state where the valve seat is in close contact with the valve body and held in the closed state. This makes it possible to prevent the outflow of the controlled fluid during de-energization.

In the case where the flow control valve of the present invention is used in the semiconductor manufacturing device, which requires accurate flow control or the like, the above mentioned effects can largely be enhanced.

DETAILED DESCRIPTION OF THE PREFERRED EMBODIMENTS

Figure 1:
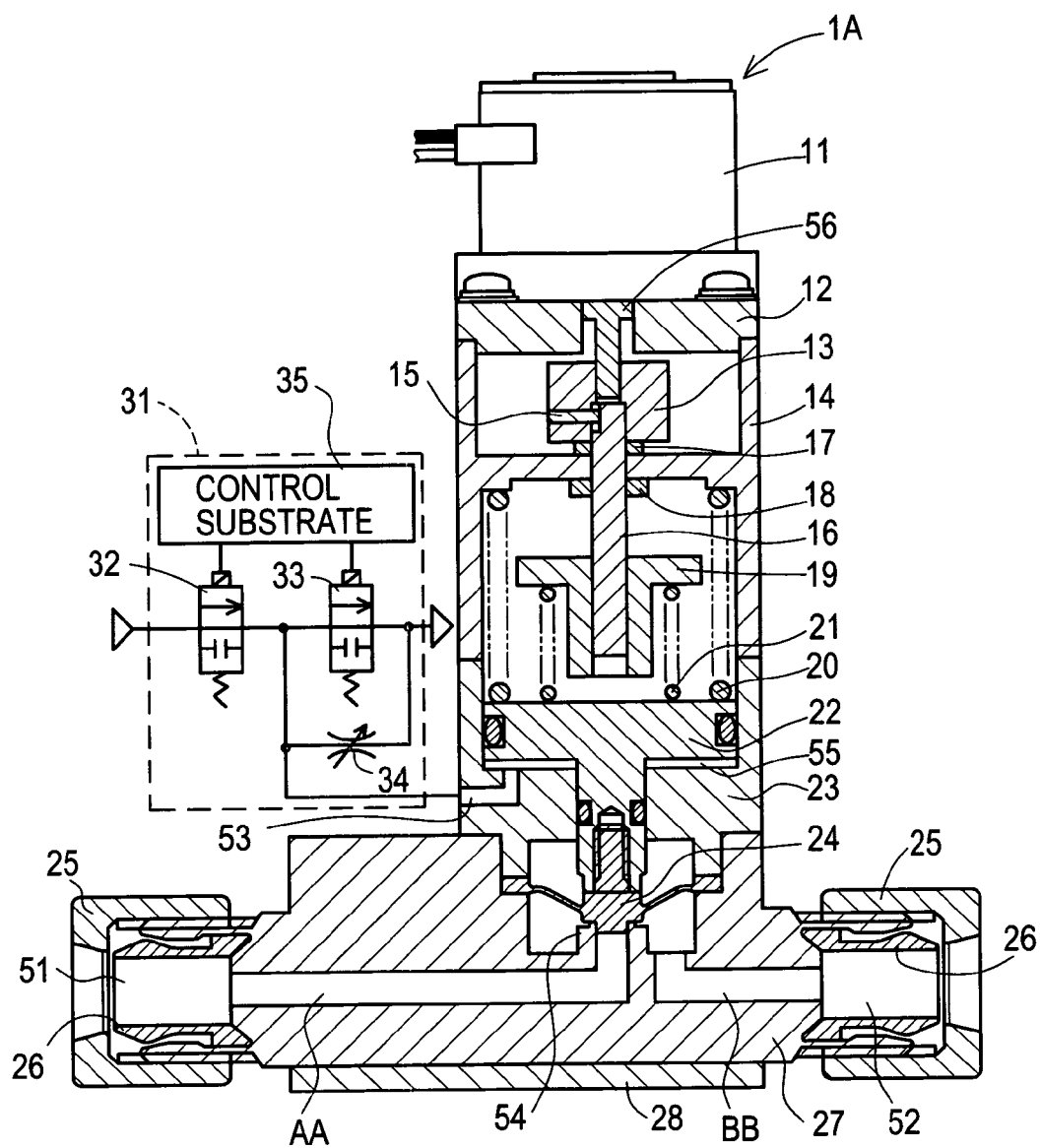
FIG. 1 is a sectional view of a flow control valve in a first preferred embodiment.

A preferred embodiment of the present invention will be described below with reference to accompanying drawings. FIG. 1 is a sectional view of a flow control valve 1A in the first embodiment. As shown in FIG. 1, the flow control valve 1A in the first embodiment has an under body 27 with an inlet port 51 and an outlet port 52 formed on either side. A cylinder 23 formed with an operation port 53 is secured on the under body 27. A housing 14 to which a cover 12 is attached is secured on the cylinder 23. Thus, the outer shape of the whole flow control valve 1A is determined.

The under body 27 is centrally provided with an annular valve seat 54 in addition to the inlet port 51 formed at a right side in the figure and the outlet port 52 formed at a left side in the figure. An inside AA of the valve seat 54 is communicated with the inlet port 51, whereas an outside BB of the valve seat 54 is communicated with the outlet port 52. When a diaphragm 24 (corresponding to a "valve body") is brought into contact with the valve seat 54, communication between the inlet port 51 and the outlet port 52 is interrupted. When the diaphragm 24 is brought out of contact with the valve seat 54, the communication between the inlet port 51 and the outlet port 52 is permitted.

It is to be noted that each of the inlet port 51 and the outlet port 52 is provided with a nut 25 and a sleeve 26 for facilitation of coupling with pipes. An attachment plate 28 is provided under the under body 27.

The cylinder 23 is a substantially cylindrical member secured on the under body 27 at a center area thereof. The cylinder 23 is formed with the operation port 53 and further internally includes a piston 22 which is fit to be slidable up and down and be air-tight. Accordingly, a lower surface of the piston 22 and an inner surface of the cylinder 23 define a pilot chamber 55. The operation port 53 opens into the pilot chamber 55. Through the operation port 53, compressed air can be supplied into or discharged from the pilot chamber 55. When the compressed air is supplied into the pilot chamber 55, the piston 22 is pushed up.

The diaphragm 24 is attached to a lower end of a lower small-diameter portion of the piston 22. A peripheral edge of the diaphragm 24 is sandwiched between the under body 27 and the cylinder 23. The diaphragm 24, which is movable in conjunction with vertical movements of the piston 22, is brought out of contact or into contact with the valve seat 54 of the under body 27. When the diaphragm 24 is brought into contact with the valve seat 54, communication between the inlet port 51 and the outlet port 52 is interrupted. When the diaphragm 24 is brought out of contact with the valve seat 54, the communication between the inlet port 51 and the outlet port 52 is permitted.

The housing 14 is a substantially cylindrical member secured on the cylinder 23. In the housing 14, a return spring 20 (corresponding to a "spring") which urges the piston 22 downward is mounted.

Further, in the housing 14, a shaft 16 on which a nut 19 (corresponding to a "contact member") is screwed is supported through thrust bearings 17 and 18. The supported shaft 16 is fixed to a coupling 13 with a pin 15 and thus connected with a shaft 56 which is rotatable by a servo motor 11 placed above the housing 14. Accordingly, rotation of the servo motor 11 can be transmitted to the shaft 16. With the servo motor 11, therefore, the nut 19 screwed on the shaft 16 can be moved to any desired position by upward and downward linear movements. It is to be noted that a return spring 21 is mounted between the nut 19 and the piston 22 to prevent wobbles of the nut 19 with respect to the shaft 16 in a thrust direction.

In other words, in the flow control valve 1A in the first embodiment, the servo motor 11, shaft 56, coupling 13, pin 15, thrust bearings 17 and 18, shaft 16, and others constitute a "motor driving control mechanism".

Figure 2:
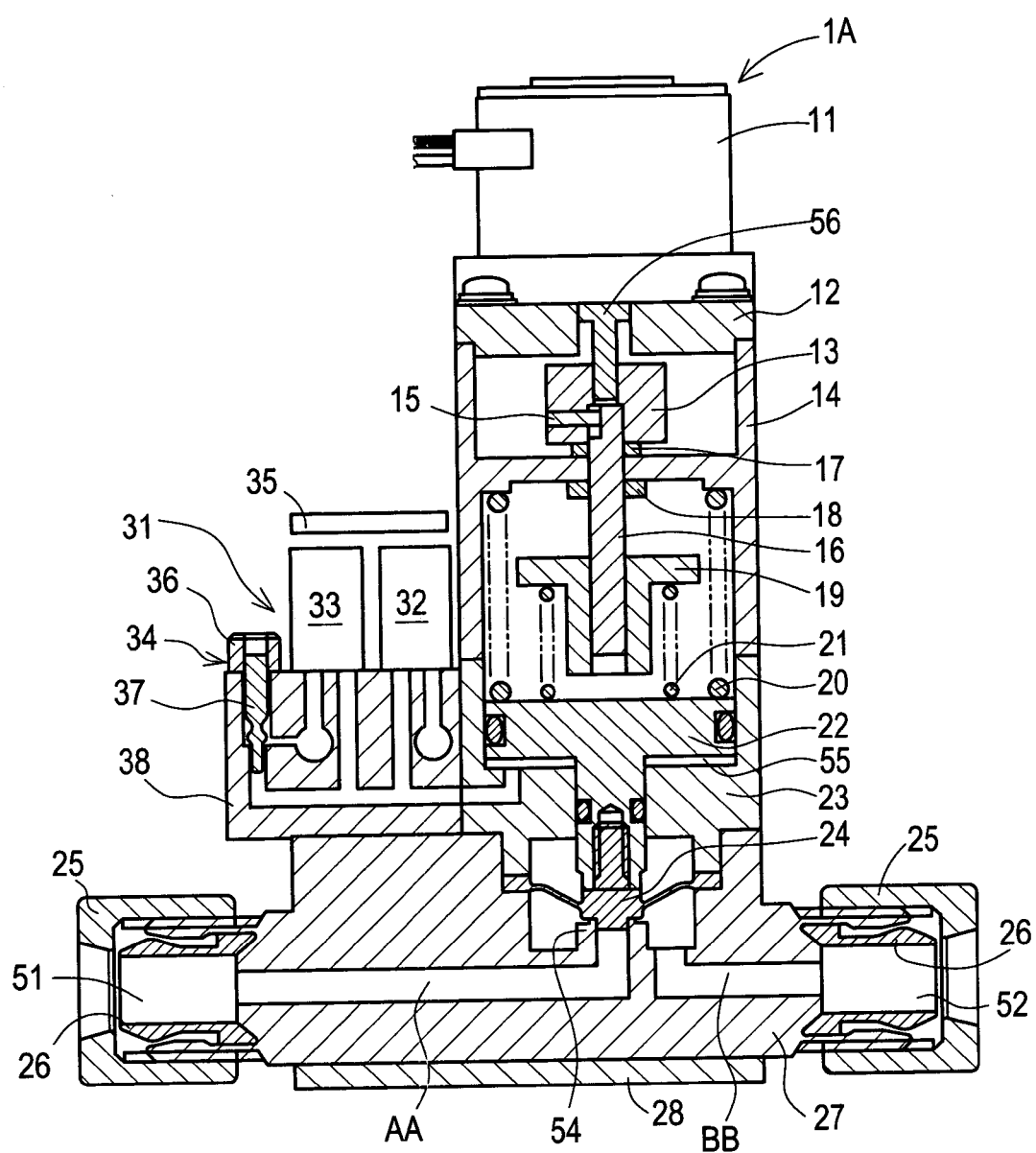
FIG. 2 is a sectional view of the flow control valve in the first preferred embodiment.

In the flow control valve 1A in the first embodiment, an electro-pneumatic regulator 31 is attached to the operation port 53 formed in the cylinder 23. This electro-pneumatic regulator 31 serves to control a normally-closed proportional intake valve 32 and a normally-closed proportional discharge valve 33 through a control substrate 35, and is also provided with a needle valve 34 (corresponding to a "bleeding mechanism") which is manually operated. To be more concrete, as shown in FIG. 2, the proportional intake valve 32, the proportional discharge valve 33, and the needle valve 34 are attached to a passage block 38 in which a supply passage and a discharge passage are formed.

It is to be noted that the needle valve 34 serves to permit communication of the operation port 53 with the outside, not through the proportional discharge valve 33. Depending on a communication level of the operation port 53 with the outside, however, it becomes impossible to supply compressed air into the pilot chamber 55 through the operation port 53. Thus, a needle 37 is moved up and down with a knob 36 to reduce the communication level of the operation port 53 with the outside.

Next, the operation of the flow control valve 1A in the first embodiment having the above structure will be explained. The flow control valve 1A in the first embodiment is operated when compressed air is supplied into the pilot chamber 55 by the electro-pneumatic regulator 31 through the operation port 53.

At first, the state where no compressed air is supplied into the operation port 53 is discussed. In this state, both of the proportional intake valve 32 and the proportional discharge valve 33 of the electro-pneumatic regulator 31 are closed, though the operation port 53 is slightly communicated with the outside through the needle valve 34. Accordingly, the inner pressure of the pilot chamber 55 is equal to the pressure of the outside, and the piston 22 receives only the urging forces of the return springs 20 and 21. The piston 22 is thus placed in a lower position where the diaphragm 24 attached to the lower end of the piston 22 is brought into close contact with the valve seat 54. In this state, the diaphragm 24 being in close contact with the valve seat 54 interrupts the communication between the inlet port 51 and the outlet port 52 and the flow control valve 1A in the first embodiment is in a closed state.

On the other hand, when the proportional intake valve 32 of the electro-pneumatic regulator 31 is opened, the compressed air is supplied into the pilot chamber 55 through the operation port 53, increasing the inner pressure of the pilot chamber 55. The piston 22 therefore is pushed up against the urging forces of the return springs 20 and 21, and moved until the upper end of the piston 22 comes into contact with the lower end of the nut 19 and then stopped. Accordingly, the diaphragm 24 is moved up in association with the movement of the piston 22 and stopped, producing a clearance between the diaphragm 24 and the valve seat 54, thereby bringing the inlet port 51 into communication with the outlet port 52. The flow rate control valve 1A in the first embodiment is placed in the opened state.

In this state, consequently, when the position of the nut 19 is changed by means of the servo motor 11, for example, the stop position of the piston 22 is changed. This makes it possible to adjust the clearance between the diaphragm 24 and the valve seat 54 in the flow control valve 1A in the first embodiment placed in the opened state, thereby to control the flow rate.

In the flow control valve 1A in the first embodiment placed in the opened state, when the electro-pneumatic regulator 31 is brought in a de-energization state due to power failure, the proportional intake vale 32 and the proportional discharge valve 33 are closed and the compressed air is gradually discharged from the pilot chamber 55 to the outside through the needle valve 34. The diaphragm 24 attached to the lower end of the piston 22 is therefore gradually moved down until it comes into close contact with the valve seat 54. Finally, the flow control valve 1A in the first embodiment is placed in the closed state.

As described above in detail, in the flow control valve 1A in the first embodiment placed in the closed state, as shown in FIGS. 1 and 2, the urging forces of the return springs 20 and 21 acts on the piston 22, so that the diaphragm 24 provided at the end of the piston 22 is held in close contact with the valve seat 54. Herein, when the compressed air is supplied into the pilot chamber 55, the pressure of the compressed air acts on the piston 22, which is moved against the urging forces of the return springs 20 and 21. Then, the diaphragm 24 provided at the end of the piston 22 is brought out of contact with the valve seat 54. The piston 22 subsequently comes into contact with the nut 19 and therefore the diaphragm 24 provided at the end of the piston 22 is stopped, fixing the clearance between the diaphragm 24 provided at the end of the piston 22 and the valve seat 54. The opened state is established.

In the flow control valve 1A in the first embodiment, of course, the nut 19 can be moved to any desired position by upward and downward linear movements by the servo motor 11 or the like. Accordingly, the position at which the piston 22 comes into contact with the nut 19 can be changed. This makes it possible to precisely adjust the clearance between the diaphragm 24 provided at the end of the piston 22 and the valve seat 54.

In other words, in the flow control valve 1A in the first embodiment, when the piston 22 comes into contact with the nut 19 and is stopped, the diaphragm 24 provided at the end of the piston 22 is also stopped, establishing the opened state, thereby fixing the clearance between the diaphragm 24 provided at the end of the piston 22 and the valve seat 54. By the servo motor 11 or the like which moves the nut 19 to any desired position by upward and downward linear movements, therefore, it is possible to accurately adjust the clearance between the diaphragm 24 provided at the end of the piston 22 and the valve seat 54 for control of the flow rate. The flow control valve 1A in the first embodiment can be said to perform the flow rate regulation by determining the stop position of the piston 22 in the opened state by the contact and to enable such flow rate regulation by remote and high-precision control.

Further, the flow control valve 1A in the first embodiment is changed to the opened state or the closed state by the pressure of compressed air supplied into the pilot chamber 55 and the urging forces of the return springs 20 and 21. The serve motor 11 or the like does not contribute to the change to the opened or closed state. Thus, the response of change to the opened/closed state is excellent.

Furthermore, while the diaphragm 24 provided at the end of the piston 22 is brought into close contact with the valve seat 54 in the flow control valve 1A in the first embodiment, the servo motor 11 or the like does not contribute to the change to the closed state and driving forces resulting from the linear movements of the shaft 16 and the nut 19 by the servo motor 11 or the like are not transmitted. Accordingly, the driving forces of the linear movements of the shaft 16 and the nut 19 by the servo motor 11 or the like do not cause damage to the diaphragm 24 provided at the end of the piton 22 and the valve seat 54.

The flow control valve 1A in the first embodiment is further provided with the electro-pneumatic regulator 31 and therefore can freely change the speed of supply/discharge of the compressed air into/from the pilot chamber 55 by electric control. It is consequently possible to perform high-precision and remote control of the speed of change to the opened/closed state in order to reduce overshoot and water hammer which may be caused at the valve opening/closing time. Further, the response of change to the opened/closed state can be enhanced.

Moreover, the flow control valve 1A in the first embodiment includes the electro-pneumatic regulator 31 which controls the normally-closed proportional intake valve 32 and the normally-closed proportional discharge valve 33 through the control substrate 35. While the electro-pneumatic regulator 31 is in the de-energization, each of the supply circuit and the discharge circuit is in the interruption state. Further, the needle valve 34 is provided to bring the inside of the pilot chamber 55 in slight communication with the outside through the operation port 53. During de-energization, the compressed air is allowed to be continuously discharged little by little from the inside of the pilot chamber 55 through the needle valve 34, and the valve is changed to the closed state and held in the closed state. It is accordingly possible to prevent the outflow of the controlled fluid during de-energization.

In the case where the flow control valve 1A in the first embodiment is used in a semiconductor manufacturing device, which requires regulation of the flow rate by remote and high-precision control, accurate control of the flow rate, and the like, the above mentioned effects can largely be exerted.

For the semiconductor manufacturing device, temperature regulation of the controlled fluid, ambient temperature, or the like is important. In the case where the flow control valve 1A in the first embodiment is used in such semiconductor manufacturing device, the flow rate regulation is performed by the frequent opening/closing operations by means of the compressed air and the return springs 20 and 21, rather than by the servo motor 11 or the like. The servo motor 11 or the like which may produce heating is less operated. Accordingly, there is no need for taking the influence which may be caused by heat of the servo motor 11 or the like into consideration.

Since the servo motor 11 or the like is less operated, the life of the servo motor 11 will not be reduced by heating. Consequently, the servo motor 11 has no affect on the life of the flow control valve 1A itself in the first embodiment.

Furthermore, the flow control valve 1A in the first embodiment is constructed so that, in the closed state, the diaphragm 24 is in close contact with the valve seat 54 by the urging force of the return spring 20. When the compressed air is supplied into the pilot chamber 55, the pressure of the compressed air exceeds the urging force of the return spring 20. The diaphragm 24 is thus brought out of contact with the valve seat 54. The opened state is established. This valve 1A herein includes the electro-pneumatic regulator 31 which controls the normally-closed proportional intake valve 32 and the normally-closed proportional discharge valve 33 through the control substrate 35. While the electro-pneumatic regulator 31 is in the de-energization state, each of the supply circuit and the discharge circuit is in the interruption state. Further, the needle valve 34 is provided to bring the inside of the pilot chamber 55 into slight communication with the outside through the operation port 53. During de-energization, the compressed air is continuously discharged little by little from the inside of the pilot chamber 55 through the needle valve 34, and the valve is changed to the closed state and held in the closed state. It is accordingly possible to prevent the outflow of the controlled fluid during de-energization.

In the case where the flow control valve 1A in the first embodiment is used in a semiconductor manufacturing device, which requires accurate control of the flow rate, the above mentioned effects can largely be exerted.

The present invention is not limited to the above mentioned embodiment and may be embodied in other specific forms without departing from the essential characteristics thereof.

For instance, in the flow control valve 1A in the first embodiment, the needle valve 34 is provided in the electro-pneumatic regulator 31, but it may be provided directly in the cylinder 23 to allow the state the compressed air to be continuously discharged little by little from the inside of the pilot chamber 55 to the outside.

In the flow control valve 1A in the first embodiment, the needle valve 34 is used as the "bleeding mechanism". However, an orifice or the like may be used therefor.

Figure 3:
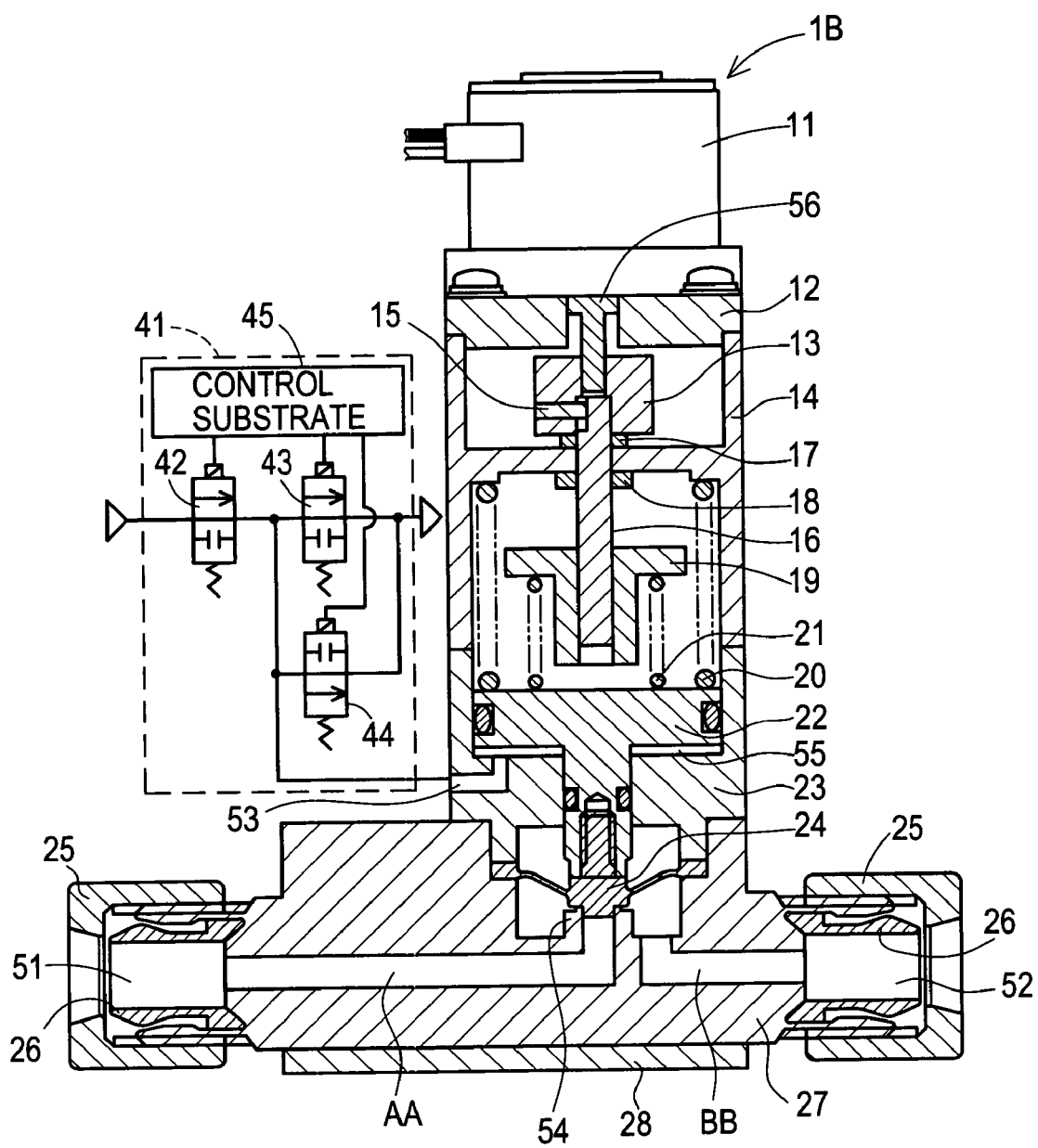
FIG. 3 is a sectional view of a flow control valve in a second preferred embodiment.
Figure 4:
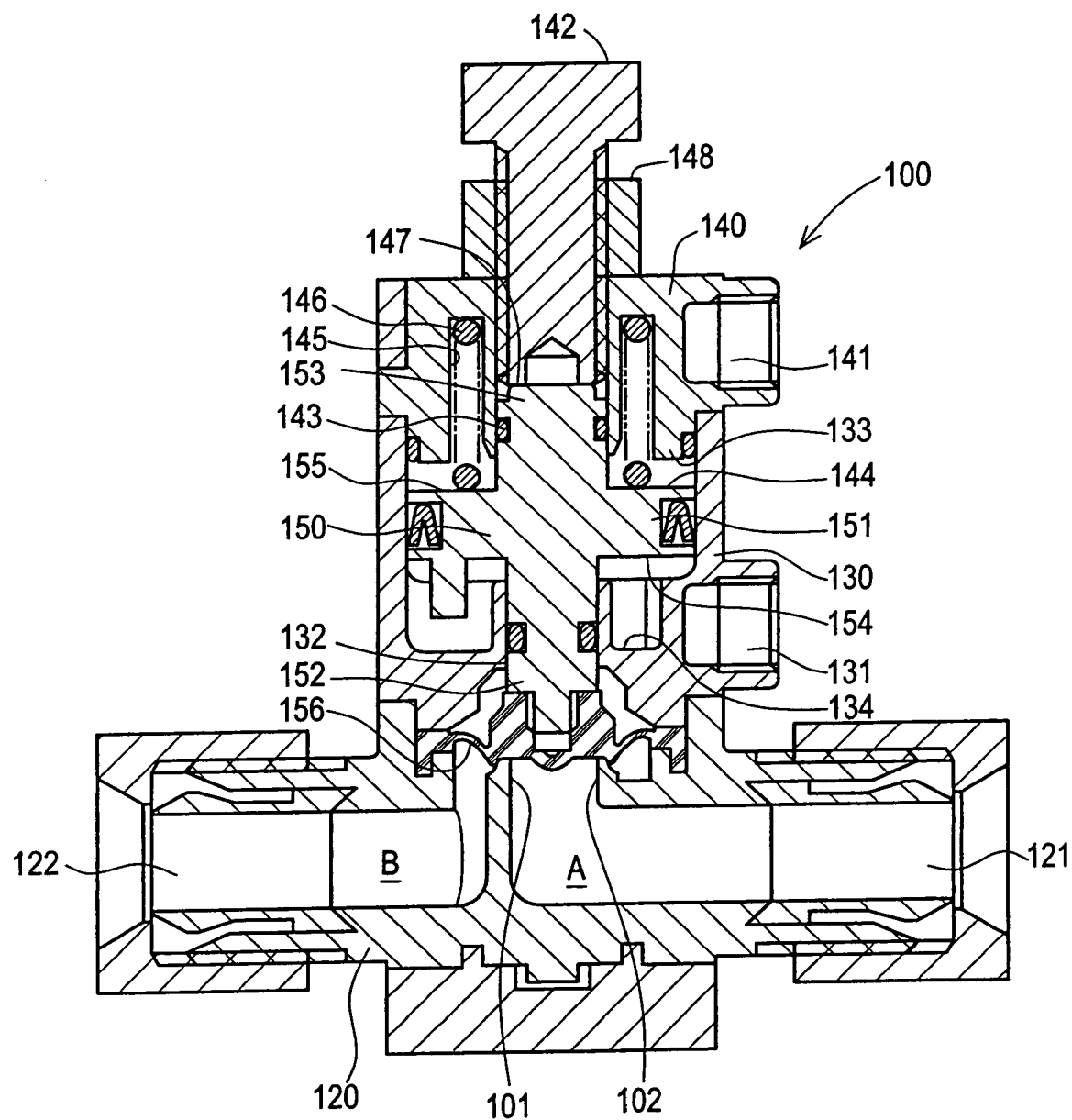
FIG. 4 is a sectional view of an example of a flow control valve in a related art.
Figure 5:
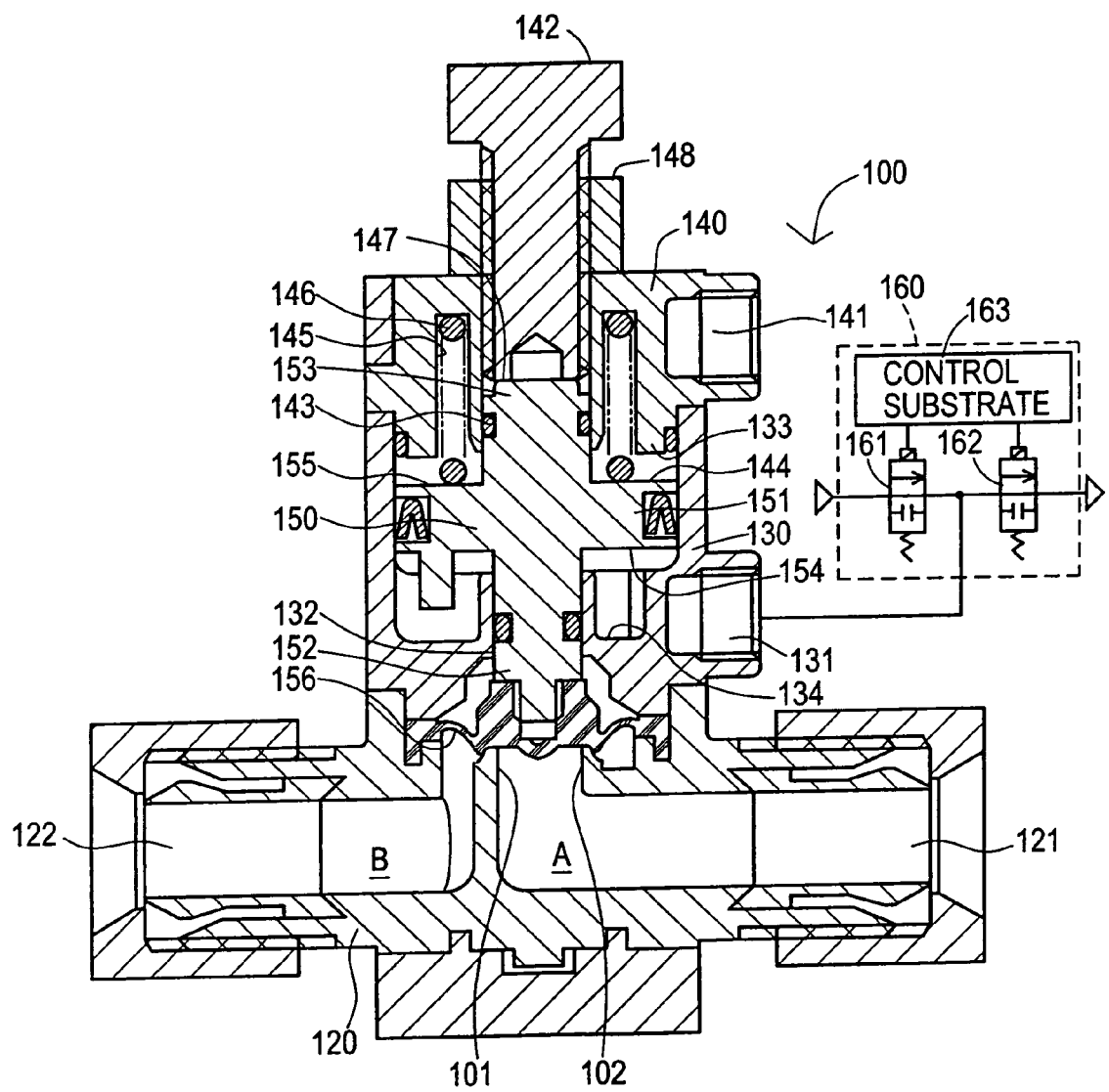
FIG. 5 is a sectional view of an example of a flow control valve in a related art.

In the flow control valve 1A in the first embodiment, the electro-pneumatic regulator 31 includes the needle valve 34 which brings the inside of the pilot chamber 55 into slight communication with the outside in order to prevent the outflow of the controlled fluid during de-energization. As a flow control valve 1B in a second embodiment shown in FIG. 3, on the other hand, it may be provided with an electro-pneumatic regulator 41 which controls a normally-closed proportional intake valve 42, a normally-closed proportional discharge valve 43, and a normally-opened proportional discharge valve 44 through a control substrate 45. During de-energization, accordingly, the compressed air is allowed to be continuously discharged from the inside of the pilot chamber 55, the valve is changed to the closed state and held in the closed state. It is therefore possible to prevent the outflow of the controlled fluid during de-energization.

The flow control valve 1B in the second embodiment is constructed so that, in the closed state, the diaphragm 24 is in close contact with the valve seat 54 by the urging force of the return spring 20. In this state, when the compressed air is supplied into the pilot chamber 55, the pressure of the compressed air exceeds the urging force of the return spring 20, and therefore the diaphragm 24 is brought out of contact with the valve seat 54, establishing the opened state. Further, there is provided the electro-pneumatic regulator 41 which controls the normally-closed proportional intake valve 42, the normally-closed proportional discharge valve 43, and the normally-opened proportional discharge valve 44 through the control substrate 45. During de-energization, the compressed air is allowed to be continuously discharged little by little from the inside of the pilot chamber 55, while the valve is changed to the closed state and held in the closed state. It is accordingly possible to prevent the outflow of the controlled fluid during de-energization.

As described above, in the flow control valve of the present invention, when the piston comes into contact with the contact member and is stopped, the valve body provided at the end of the piston is also stopped. The opened state is established, in which the clearance between the valve body provided in the piston and the valve seat is fixed. By the motor driving control mechanism which moves the contact member to any desired position by forward and backward linear movements, it is possible to accurately regulate the clearance between the valve body provided in the piston and the valve seat for control of the flow rate. The flow control valve of the present invention regulates the flow rate by determining the stop position of the piston by the contact in the opened state and enables remote and high-precision control of such regulation of the flow rate.

The flow control valve of the present invention is further constructed so that, in the closed state, the valve body is in close contact with the valve seat by the urging force of the spring, and the valve body is brought out of contact with the valve seat when the compressed air is supplied into the pilot chamber and the pressure of the compressed air exceeds the urging force of the spring. The opened state is established. When the de-energization state of the electro-pneumatic regulator corresponds to the communication state of the discharge circuit, the compressed air is allowed to be continuously discharged from the pilot chamber, while the valve is changed to the closed state and held in the closed state. Accordingly, it is possible to prevent the outflow of the controlled fluid during de-energization.

In the closed state of the flow control valve of the present invention, the valve body is in close contact with the valve seat by the urging force of the spring, and the valve body is brought out of contact with the valve seat when the compressed air is supplied into the pilot chamber and the pressure of the compressed air exceeds the urging force of the spring, and the valve is placed in the opened state. Since the bleeding mechanism is further provided for bringing the pilot chamber into slight communication with the outside, the compressed air is allowed to be continuously discharged little by little from the pilot chamber through the bleeding mechanism, while the valve is changed to the state where the valve body is in close contact with the valve seat and held in the closed state. It is therefore possible to prevent the outflow of the controlled fluid during de-energization.

What is claimed is:

1. A flow control valve comprising:
a valve seat;

a valve body which is movable into or out of contact with the valve seat;

a pilot chamber into which compressed air is supplied, thereby moving the valve body to place the valve in an opened state;

a spring which urges the valve body in close contact with the valve seat to place the valve in a closed state; and an electro-pneumatic regulator that controls supply and discharge of compressed air into or from the pilot chamber, the electro-pneumatic regulator comprising:

a proportional intake valve that supplies compressed air into the pilot chamber;

a proportional discharge valve that discharges compressed air from the pilot chamber; and a passage block internally provided with (i) a supply passage through which a supply source of the compressed air and the pilot chamber are brought into communication by the proportional intake valve; (ii) a discharge passage through which the pilot chamber and the outside are brought into communication by the proportional discharge valve, and (iii) a communication passage through which the pilot chamber and the outside are brought into communication not through the proportional discharge valve.

2. The flow control valve according to claim 1, which is used in a semiconductor manufacturing device.

3. The flow control valve according to claim 1, wherein the electro-pneumatic regulator is directly integrally fixed to a cylinder formed with an operation port.

4. A flow control valve comprising:

a valve seat;

a valve body which is movable into or out of contact with the valve seat;

a pilot chamber into which compressed air is supplied, thereby moving the valve body to place the valve in an opened state;

a spring which urges the valve body in close contact with the valve seat to place the valve in a closed state; and an electro-pneumatic regulator that controls supply and discharge of compressed air into or from the pilot chamber, the electro-pneumatic regulator comprising:

a proportional intake valve that supplies compressed air into the pilot chamber;

a proportional discharge valve that discharges compressed air from the pilot chamber; and a passage block internally provided with (i) a supply passage through which a supply source of the compressed air and the pilot chamber are brought into communication by the proportional intake valve, (ii) a discharge passage through which the pilot chamber and the outside are brought into communication by the proportional discharge valve, and (iii) a communication passage therein with a bleeding mechanism that brings the pilot chamber into slight communication with the outside not through the proportional discharge valve.

5. The flow control valve according to claim 4, which is used in a semiconductor manufacturing device.

6. The flow control valve according to claim 4, wherein the electro-pneumatic regulator is directly integrally fixed to a cylinder formed with an operation port.

* * * * *